United States Patent [19]

Sweet et al.

[11] Patent Number: 5,756,572
[45] Date of Patent: May 26, 1998

[54] SILICONE PRESSURE SENSITIVE ADHESIVE COMPOSITION CONTAINING THERMOPLASTIC MULTI-SEGMENTED COPOLYMER

[75] Inventors: Randall P. Sweet; Katherine L. Ulman, both of Midland County, Mich.

[73] Assignee: Dow Corning Corporation, Midland, Mich.

[21] Appl. No.: 746,960

[22] Filed: Nov. 18, 1996

Related U.S. Application Data

[63] Continuation of Ser. No. 506,271, Jul. 24, 1995, abandoned.

[51] Int. Cl.$^6$ ............................................. A61F 13/02
[52] U.S. Cl. .................. 524/448; 514/772.1; 514/772.3; 524/268; 525/452; 525/474; 525/477
[58] Field of Search ........................ 524/268; 525/452, 525/474, 477; 528/448; 514/772.1, 772.3

[56] References Cited

U.S. PATENT DOCUMENTS

| | | | |
|---|---|---|---|
| 2,857,356 | 10/1958 | Goodwin et al. | 528/28 |
| 3,997,702 | 12/1976 | Schurb et al. | 428/352 |
| 4,002,794 | 1/1977 | Schwarcz | 428/352 |
| 4,686,137 | 8/1987 | Ward, Jr. et al. | 428/290 |
| 4,840,796 | 6/1989 | Sweet et al. | 424/448 |
| 4,855,077 | 8/1989 | Shikinami et al. | 252/518 |
| 4,882,377 | 11/1989 | Sweet et al. | 524/267 |
| 4,951,657 | 8/1990 | Pfister et al. | 128/156 |
| 4,973,513 | 11/1990 | Riedel | 428/252 |
| 5,008,115 | 4/1991 | Lee et al. | 424/486 |
| 5,115,035 | 5/1992 | Shiraki et al. | 525/314 |
| 5,214,119 | 5/1993 | Leir et al. | 528/28 |

*Primary Examiner*—Frederick Krass
*Attorney, Agent, or Firm*—Richard I. Gearhart

[57] ABSTRACT

A pressure sensitive adhesive composition comprises a mixture of (A) a silicate resin, (B) a silicone fluid, and (C) a thermoplastic multi-segmented copolymer which is a product of the reaction between a diisocyanate and a reactive polyorganosiloxane having two groups reactive with isocyanate thereon. The thermoplastic multi-segmented copolymer comprises from about 1 to about 40 weight percent hard segments derived from reactants selected from the group consisting of organic diisocyanates, organic diols, and organic diamines and from about 60 to about 99 weight percent soft segments comprising from about 15 to about 99 weight percent, based on the weight of the thermoplastic multi-segmented copolymer, of polyorganosiloxane units and from about 0 to about 70 weight percent, based on the weight of the thermoplastic multi-segmented copolymer, of polyalkylene oxide units.

21 Claims, No Drawings

SILICONE PRESSURE SENSITIVE ADHESIVE COMPOSITION CONTAINING THERMOPLASTIC MULTI-SEGMENTED COPOLYMER

This application is a continuation of application Ser. No. 08/506,271 filed Jul. 24, 1995 which application is now abandoned.

BACKGROUND OF THE INVENTION

1. Field of the Invention

The present invention relates generally to pressure sensitive adhesive compositions and, more particularly, to silicone pressure sensitive adhesive compositions containing thermoplastic multi-segmented copolymers.

2. Description of the Related Art

A pressure sensitive adhesive, generally, is a material which adheres to a surface with slight pressure and can release from a surface with negligible transfer of the material to the surface. Silicone pressure sensitive adhesives have been found to be preferred over other types of pressure sensitive adhesives in many applications, especially in the medical area. For example, silicone pressure sensitive adhesives, due to the fact that they are acceptable for topical use, have found use in transdermal drug delivery applications which involve the adherence and sealing of a drug-containing patch to a patient's skin.

However, many current silicone pressure sensitive adhesives experience a degree of "cold flow", that is, flowing or softening at temperatures near room temperature. The amount of cold flow is increased when the silicone pressure sensitive adhesive is in contact with a patient's skin, as the higher temperature of a patient's skin causes a further softening of the silicone pressure sensitive adhesive. Flowing or softening of the pressure sensitive adhesive on the drug-containing patch during storage or use which can decrease the efficacy of the drug-containing patch. There is, therefore, a need for a silicone pressure sensitive adhesive having a reduced propensity for cold flow.

Other desirable attributes of a pressure sensitive adhesive include the biocompatibility of the pressure sensitive adhesive to animal skin and the capability of (a) making the pressure sensitive adhesive hot-meltable, (b) modifying the properties of the pressure sensitive adhesive, such as drug permeability, solubility, adhesiveness, releasibility, and tackiness, and (c) making the pressure sensitive adhesive either transparent or white resulting in an aesthetically-pleasing product.

SUMMARY OF THE INVENTION

It is, therefore, one object of the present invention to provide a silicone pressure sensitive adhesive composition which has a reduced propensity for cold flow.

It is another object of the present invention to provide a silicone pressure sensitive adhesive composition which is biocompatible with animal skin.

It is yet another object of the present invention to provide a silicone pressure sensitive adhesive composition which can be made hot-meltable.

It is still another object of the present invention to provide a silicone pressure sensitive adhesive composition which is capable of being modified to alter properties, such as drug permeability, solubility, adhesiveness, releasibility, and tackiness.

It is still another object of the present invention to provide a silicone pressure sensitive adhesive composition which can be made either transparent or white.

To achieve the foregoing objects, the present invention is a pressure sensitive adhesive composition, comprising a mixture of a silicate resin, a silicone fluid, and a thermoplastic multi-segmented copolymer which is a product of the reaction between a diisocyanate and a reactive polyorganosiloxane having two groups reactive with isocyanate. The pressure sensitive adhesive composition exhibits tackiness and exhibits adhesiveness upon applying slight pressure thereto.

One advantage of the present invention is that it provides a silicone pressure sensitive adhesive composition that has a reduced propensity for cold flow relative to many current silicone pressure sensitive adhesives. Another advantage of the present invention is that it provides a silicone pressure sensitive adhesive composition that is biocompatible with animal skin. Yet another advantage of the present invention is that it provides a silicone pressure sensitive adhesive composition which may be made hot-meltable and which may be compositionally tailored to modify its properties, such as drug permeability, solubility, adhesiveness, releasibility, and tackiness. Still another advantage of the present invention is that it provides a silicone pressure sensitive adhesive composition which may be made transparent or white resulting in an aesthetically-pleasing product.

Other objects, features, and advantages of the present invention will be readily appreciated as the same becomes better understood after reading the subsequent description.

DESCRIPTION OF THE PREFERRED EMBODIMENT(S)

The present invention generally entails a pressure sensitive adhesive composition which contains a mixture of a silicate resin, a silicone fluid, and a thermoplastic multi-segmented (block) copolymer which is a product of the reaction between a diisocyanate and a reactive polyorganosiloxane having two groups reactive with isocyanate.

The silicate resin and the silicone fluid are together employed from about 75 to about 99 weight percent of the composition, and the thermoplastic multi-segmented copolymer is employed from about 1 to about 25 weight percent of the composition. Preferably, the silicate resin and the silicone fluid are together employed from about 90 to about 99 weight percent of the composition, and the thermoplastic multi-segmented copolymer is employed from about 1 to about 10 weight percent of the composition.

Typically, in the present compositions, the silicate resin and the silicone fluid are employed in a weight ratio from about 40:50 to about 70:30 silicate resin to silicone fluid. It is usually preferred that the silicate resin and the silicone fluid be employed in a weight ratio from about 50:50 to about 60:40 silicate resin to silicone fluid.

The Silicone Resin and the Silicone Fluid

One silicone resin suitable for the present invention contains a trimethyisilyl-endblocked polysilicate resin consisting of a benzene-soluble resinous copolymer containing silicon-bonded hydroxyl radicals and consisting essentially of triorganosiloxy units of the formula $R_3SiO_{1/2}$ and tetrafunctionalsiloxy units of the formula $SiO_{4/2}$ in a ratio of about 0.6 to 0.9 triorganosiloxy units for each tetrafunctionalsiloxy unit present in the copolymer, wherein each R is a monovalent organic radical independently selected from the group consisting of hydrocarbon radicals of from 1 to 6 inclusive carbon atoms. This silicate resin may be blended with a silanol-endstopped polydiorganosiloxane fluid, e.g. a polydimethylsiloxane fluid, which combination is disclosed in U.S. Pat. No. 2,736,721 to Dexter, et al. and U.S. Pat. No. 2,814,601, to Currie, et al., which patents are hereby incorporated by reference.

Another suitable silicate resin and silicone fluid combination useful in the present invention is that or those similar to those disclosed in U.S. Pat. No. 2,857,356, to Goodwin, Jr., which is hereby incorporated by reference. The Goodwin, Jr. patent teaches of compositions which consist of a mixture of (i) a cohydrolysis product of a trialkyl hydrolyzable silane and alkyl silicate, wherein the cohydrolysis product contains a plurality of silicon-bonded hydroxy groups, and (ii) a linear, high viscosity organopolysiloxane fluid containing silicon-bonded hydroxy groups.

The silicate resin and the silicone fluid may optionally be condensed together according to a procedure such as that described in Canadian Patent 711,756 to Pail, which patent is hereby incorporated by reference. In such a condensation reaction, the silicate resin and the silicone fluid are mixed together in the presence of a catalytic amount of a silanol condensation catalyst, and then the silicate resin and the silicone fluid are condensed, for example, by heating under reflux conditions for 1 to 20 hours. Examples of silanol condensation catalysts are primary, secondary, and tertiary amines, carboxylic acids of these amines and quaternary ammonium salts.

Other silicate resin and silicone fluid combinations which are suitable for use in the present invention are those compositions described in U.S. Pat. Nos. 4,551,622 and 4,584,355 to Blizzard et al., U.S. Pat. No. 4,585,836 to Homan et al., and U.S. Pat. No. 4,655,767 to Woodard et al., which patents are hereby incorporated by reference. Generally, these compositions consist of a blend of a silicate resin and a silicone fluid which are chemically treated so as to reduce the silicon-bonded hydroxyl content of the blend. These compositions may optionally be condensed as described immediately above prior to the chemical treatment.

The Thermoplastic Copolymer

To form the pressure sensitive adhesive composition of the present invention, the silicate resin and the silicone fluid are blended with a thermoplastic multi-segmented copolymer which is the product of the reaction between a diisocyanate and a reactive polyorganosiloxane having two groups reactive with isocyanate. The thermoplastic multi-segmented copolymer comprises from about 1 to about 40 weight percent "hard" segments consisting essentially of units derived from an organic diisocyanate and, if desired, a difunctional chain extender, and from about 60 to about 99 weight percent "soft" segments comprising from about 15 to about 99 weight percent, based on the weight of the thermoplastic copolymer, of a hydrophobic portion consisting essentially of one or more polyorganosiloxane units, and from 0 to about 70 weight percent, based on the weight of the thermoplastic copolymer, of a hydrophilic portion consisting essentially of at least one polyalkylene oxide unit, preferably polyethylene oxide. The polyorganosiloxane units consists essentially of at least one sequence of from 10 to about 300 organosiloxane units. If present, the hydrophilic soft portion of the soft segment consists essentially of at least one sequence per thermoplastic copolymer molecule of from about 5 to about 75 alkylene oxide units. Preferably, the hard segments are present from about 3 to about 25 weight percent and the soft segments are present from about 75 to about 97 weight percent based on the weight of the thermoplastic copolymer. It is also preferred that the molar ratio of hard segments to soft segments is from about 1:1 to about 5:1.

The molecules of the thermoplastic copolymer contain at least one segment of a "hard" polymer and at least one segment of a "soft" polymer. It is understood in the art that the terms "hard" and "soft" as applied to the segments of the thermoplastic copolymer refer to the relative glass-transition temperatures ($T_g$) of the segments. The card segment has a substantially higher glass-transition temperature than the soft segment.

Preferably, the thermoplastic copolymer has a number-average molecular weight of from about 30,000 to about 120,000.

The Diisocoyanate

Suitable diisocyanates which may be used to prepare thermoplastic copolymer may be any of the available aliphatic (including cycloaliphatic) or aromatic diisocyanates. Examples of such diisocyanates include 1,5-naphthalene diisocyanate; p-phenylene diisocyanate; tolylene diisocyanate; 3,3'-dimethyl-4,4'-biphenyl diisocyanate; 4,4'-methylene diisocyanate; p-xylene diisocyanate; m-trimethyl-xylylene diisocyanate; trans-, 1,4-cyclohexylene diisocyanate; hexamethylene diisocyanate; trimethyl hexamethylene diisocyanate; hydrogenated methylene diisocyanate; 4,4'-diphenyl methane diisocyanate; 4,4'-dicyclohexylmethyl diisocyanate, and isophorene diisocyanate. Preferred diisocyanates include 4,4'-methylene diisocyanate and hydrogenated methylene diisocyanate.

The Difunctional Chain Extenders

Suitable difunctional chain extenders which may be used to prepare a portion of the hard segments of the thermoplastic copolymer may be any low molecular weight diol or diamine. Examples of difunctional chain extenders are aliphatic (including cycloaliphatic) and aromatic diols or diamines having from 2 to 20 carbon atoms. Examples of such diols and diamines include 1,4-butanediol; 1,3-butanediol; 1,6-hexamethylenediol; 2,2-dimethyl-1,3-propanediol; 1,4-cyclohexanedimethylol; hydroquinone di-(B hydroxide ethyl ether); 1,1'-isopropylidine-bis-(p-phenylene-oxy)-di-2-ethanol; poly(tetramethylene ether) glycol; ethylene glycol; 1,2-diaminoethane; 1,4-diaminobutane; 1,2-propanediamine; hexamethylenediamine; diethylene diamine; 5-amino-1-(amino methyl)-1,3,3-trimethyl cyclohexane; 4,4'-methylene bis(cyclohexylamine; and ethanol amine. Diols having from 2 to 4 carbon atoms are preferred, based on the availability and environmental compatibility of these compounds.

The Reactive Polyorganosiloxane

The reactive polyorganosiloxanes useful in preparing the thermoplastic copolymers used in the present invention are those having two, (preferably, no more and no less than two) terminal groups reactive with isocyanates. Examples of such groups reactive with isocyanate include amino-functional, carbinol-functional, mercapto-functional, and epoxy-functional groups.

The reactive polyorganosiloxane preferably has from about 10 to about 300 repeating diorganosiloxy units, optionally, with some triorganosiloxy and/or monoorganosiloxy units. The reactive polyorganosiloxane may be linear or branched, but it is preferably linear having two terminal organo groups c: each silicon which are reactive with isocyanates. The organo groups may be the same or different. The organo groups are not limited to, but may be alkyl having from 1 to 8 carbon atoms, inclusive; 3,3,3-trifluoropropyl; phenyl; triorganosiloxy (i.e., —OSiR$_1$, wherein R may be an alkyl group from 1 to 6 carbon atoms, inclusive); or alkenyl. Most preferably, the polyorganosiloxane is polydimethyisiloxane because of its commercial availability.

When an amino-functional polyorganosiloxane is reacted with a diisocyanate, a silicone-urea copolymer results. Exemplary amino-functional groups reactive with isocyanate which may be bonded to a silicon on the polyorganosiloxane have the following general formula:

HN(R')R"—.

When a carbinol-functional polyorganosiloxane is reacted with a diisocyanate, a silicone-urethane results. Exemplary carbinol-functional groups reactive with isocyanate which may be bonded to a silicon on the polyorganosiloxane have the following general formula:

HOR'—.

Exemplary mercapto-functional groups reactive with isocyanate which may be bonded to a silicon on the polyorganosiloxane have the following general formula:

HSR'—.

In the above general formulas, R' is a monovalent hydrocarbon radical and R" represents an alkylene radical. Each of the R' and R" radicals may be the same or different.

Exemplary epoxy functional groups reactive with isocyanate are epoxies bonded to a divalent organic radical which, in turn, are bondable to a silicon on the polyorganosiloxane. The organic radical may be, among other things, an alkylene radical or an alkylene ether radical.

Methods for Making the Thermoplastic Copolymer

Methods for preparing reactive polyorganosiloxanes and copolymerizing these polymers with diisocyanates and other organic monomers are known in the art and do not form part of this invention. See, for example, U.S. Patent Nos. 4,631,629, 4,840,796, 4,951,657, and 5,008,115, and the article "Segmented Organosiloxane Copolymers", Polymer, Vol. 25, pp 1807–1816, which patents and article are hereby incorporated by reference.

Generally, a method for preparing the thermoplastic copolymers is by mixing the reactive polyorganosiloxane and the organic diisocyanate together to form a mixture and heating the mixture in the presence or a suitable catalyst, if needed, to cause the reaction between the reactive polyorganosiloxane and the diisocyanate to occur. The reaction is typically run with a slight excess of either the reactive polyorganosiloxane or the diisocyanate, preferably, with a slight excess of the diisocyanate, to react with any water present in the mixture. A typical molar ratio of reactive polyorganosiloxane to diisocyanate used for reaction is about 0.95:1.05. The hard segment of the thermoplastic copolymer may optionally include a chain extender which when added to the reaction mixture is heated continuously until substantially all of the diisocyanate is reacted, which typically takes an additional 2 to 16 hours. The reaction is preferably conducted under an inert atmosphere such as nitrogen using, as the reaction medium, one or more organic solvents, such as, toluene, tetrahydrofuran, dimethylformamide, or mixtures thereof, which will dissolve the reactants and the resultant thermoplastic copolymer.

Optional Additives to the Pressure Sensitive Adhesive Composition

The compositions of the present invention may optionally containing viscosity reducing agent (such as trimethylendblocked polydimethylsiloxane), drugs, excipients, solvents, and the like. Optionally, the pressure sensitive adhesive compositions of the present invention may include a minor amount of filler, such as extending or reinforcing filler. It is usually desired that the filler be present in an amount less than about 5 weight % based on the total weight of the silicate resin and the silicone fluid, because higher quantities of filler often cause the silicone pressure sensitive adhesive to lose track and adhesiveness and to increase in viscosity, making it more difficult to coat onto a substrate.

Preparation of the Pressure Sensitive Adhesive Composition

The silicone pressure sensitive adhesive compositions of this invention may be made by mixing the components in any order. One way of mixing the components is by heating a blend of the silicate resin and the silicone fluid to the melting temperature of the thermoplastic copolymer and then slowly adding the thermoplastic copolymer to the heated blend. Another way of mixing the components is by (a) solvating a blend of the silicate resin and the silicone fluid with a suitable solvent, such as trichlorofluoromethane, hexane, toluene, xylene, or ethylacetate, (b) blending the thermoplastic copolymer into the solvated blend, and (c) evaporating the solvent from the blend.

Using the Pressure Sensitive Adhesive Composition

The pressure sensitive adhesive compositions of the invention will adhere to many substrates, such as paper, cloth, glass cloth, silicone rubber, polyethylene, polyethylene terephthalate, polytetrafluoroethylene, glass, wood, metals, and skin. Therefore, there are many uses for the pressure sensitive adhesive compositions of this invention.

The pressure sensitive adhesive compositions of the present invention may be coated onto a substrate by hot-melt coating techniques or by applying the compositions in solvent and subsequently evaporating the solvent. To apply the pressure sensitive adhesive compositions to a substrate, the application may be accomplished by using any conventional means, such as, roller coating, dip coating, extrusion, knife coating, or spray coating.

When coating the composition onto a substrate using hot-melt coating techniques, the method typically comprises the steps of (a) heating the pressure sensitive adhesive composition to a coatable temperature above 25° C. (typically above 100° C. and preferably above 150° C.), (b) coating the heated pressure sensitive adhesive composition on the substrate, and (c) cooling the coated pressure sensitive adhesive composition until it is in a generally non-flowing state. The coating temperatures should be low enough so that decomposition of the composition does not occur. Lower temperatures may result in coatable viscosities depending on the coating equipment used, the desired end product, and the composition of the pressure sensitive adhesive composition.

Optionally, after coating, the compositions may be cured. When the composition is to be cured, the composition may further contain a curing catalyst. The process of crosslinking silicone pressure sensitive adhesives is known in the art. For example, see "Silicone Pressure—Sensitive Adhesives" by D. F. Merrill in the *Handbook Of Pressure—Sensitive Adhesive Technology*, edited by D. Satas (Van Nostrand Reinhold, Florence, Ky., 1982), pages 344–352 and "Formulating Silicone Pressure Sensitive Adhesives For Application Performances" by L. A. Sobieski in *Making It Stick in '86, Advances In Pressure—Sensitive Tape Technology*, seminar proceedings (Pressure Sensitive Tape Council, Deerfield, Ill., 1986) pages 1–5, both sources being hereby incorporated by reference.

The pressure sensitive adhesive compositions or this invention are especially suitable for assisting in delivering a bioactive agent, such as a drug, to a bioactive-agent-accepting substrate, such as a patient's skin. The pressure sensitive adhesive composition of this invention may be employed in two modes of bioactive agent delivery. One mode is by incorporating the bioactive agent in the pressure sensitive adhesive composition which is thereafter attached to the substrate to commence delivery. The second mode of delivery is by attaching a membrane of the pressure sensitive adhesive composition to the substrate and contacting a reservoir or matrix including a bioactive agent to the attached membrane. The bioactive agent may then pass from the reservoir or matrix through the attached membrane and to the substrate for absorption. The third mode of delivery is accomplished by applying pressure sensitive adhesive to the perimeter of a delivery device having a bioactive-agent-containing matrix in the center. The delivery device is then attached to the substrate and the bioactive-agent-containing matrix contacts the substrate directly.

The following examples of the invention are meant to be illustrative only and should not be construed as limiting the invention which is properly delineated in the appended claims. In the following examples, all parts and percentages are by weight unless otherwise specified.

N.V.C. (Nonvolatile Content) of a resin, as given below, was determined by mixing 1.5 g of the resin with 0.75 g of a 100 cst. viscosity trimethylsiloxy-endblocked polydimethylsiloxane PDMS) fluid in an aluminum fail dish, 60 mm in diameter and 15 mm deep, and heating the sample for 2 hours at 150° C. in an air-circulating oven. The heated sample was then cooled to room temperature and reweighed to determine the weight of the nonvolatile material (w) The N.V.C., in percent, is equal to 100×w/1.5.

For the Following examples, Resin A-1 was a xylene solution of a silicate resin prepared from 45 parts of sodium silicate (41.6 Be) and 20 parts of $(CH_3)_3SiCl$ according to the method of U.S. Pat. No. 2,676,182 to Daudt, et al., which is hereby incorporated by reference, and contained $(CH_3)_3SiO_{1/2}$ units and $SiO_{4/2}$ units in a ratio of approximately 0.75:1.0, and had a N.V.C. about 69–71%, an acid number in the range of 0.3 to 1.4, a viscosity in the range of 10–14 centipoise at 25° C. at 60% N.V.C. in xylene, and a silicon-bonded hydroxyl content of about 2.5 weight percent based on a 100% N.V.C.

Resin A-2 was devolatilized Resin A-1 (100% nonvolatile content).

PDMS Fluid A was a homogeneous mixture of a hydroxyl-endblocked polydimethylsiloxane having a number-average molecular weight of approximately 40,000 and minor amounts of cyclic polydimethylsiloxane having degrees of polymerization between 4 and 30, the mixture having a viscosity between 12,000 and 15,000 centipoise as measured using a Brookfield Viscometer model HAF with spindle #3 at 10 RPM's.

PSA "A" was prepared by homogeneously mixing 55 parts by weight of Resin A-2 and 45 parts by weight PDMS Fluid A by solvating them in xylene in an amount forming a 70% xylene solution. The mixture was then heated to 100° C. and anhydrous ammonia was passed through the mixture at a rate of 11 ml/min/lb of non-volatile component of the mixture for 2 hours. To endcap the mixture, hexamethyldisilazane was then admixed at a 3:1 mole ratio of endblocking triorganosilyl to total silicon-bonded hydroxl radicals present in the silicate and polydimethylsiloxane, and the mixture was allowed to react for 3 hours at 95°–100° C. The mixture was then heated to 140° C. and maintained at 140° C. under reflux conditions for 3 hours to remove condensation water. The mixture was then stripped to greater than 90% nonvolatile content.

PSA "B" was a pressure sensitive adhesive composition prepared by homogeneously mixing 60 parts of Resin A-1, 40 parts of PDMS Fluid A, and a portion of 2.4 parts of ammonium carbonate, heating the mixture to 100° C. and maintaining the temperature at 100° C. for 1 hour. Then the remaining portion of the 2.4 parts ammonium carbonate was added to the mixture, and mixing was continued for another hour at 100° C. The mixture was then stripped for 16 hours at 100° C. to remove the volatile components. PSA "B" cooled to room temperature had (1) a specific gravity of 1.085–1.115, (2) a N.V.C. of at least 98.8% where N.V.C. is defined as above except that a 1 g. sample was used and the temperature of the oven was 177° C. (3) plasticity of 150–200×10⁻inches as measured after a 24-hour rest and after force was applied on a 2-gram specimen for 3 minutes –/–5 seconds using ASTM D926, and (4), when dispersed In trichlorotrifluoroethane to an N.V.C. of 18.5%, the adhesive peel measured at least 1600 g.

PSA "C" was prepared by the same procedure used in the preparation of PSA "B" except for the levels of Resin A-1 and PDMS fluid A used. For making PSA "C", 55 parts of Resin A-1 and 45 parts of PDMS Fluid A were used.

PSA "D" was prepared by homogeneously mixing 26.74 parts of a hydroxy-endblocked polydimethylsiloxane gum having a plasticity between 47 and 60 mils, 30.14 parts Resin A-2, 39.58 parts xylene, 3.40 parts isopropanol, and 0.14 carts of a mixture consisting or 9% tetramethylguanidine, 9% 2-ethyl hexoic acid, and 82% xylene. The plasticity of the gum was measured at room temperature and after force was applied on a 4.2-gram specimen for 3 minutes +/– 5 seconds using ASTM D926. The homogeneous mixture was then stripped to remove the volatile components.

SILICONE UREA "A" was prepared by reacting hydrogenated methylene diisocyanate with a linear polydimethylsiloxane having a degree of polymerization of 100 and a N-methylamino-isobutyl functionality on each end. The reaction was completed using about 1.05 moles of the diisocyanate per 0.95 moles of the amino-functional polydimethylsiloxane.

SILICONE UREA "B" was prepared by the same procedure as that used for SILICONE UREA "A", except that the degree of polymerization of the polydimethylsiloxane was 200.

SILICONE UREA "C" was prepared by the same procedure as that used for SILICONE UREA "A", except that the degree of polymerization of the polydimethylsiloxane was 300.

Preparation of Tapes

Tapes were prepared using the silicone pressure sensitive adhesive compositions of the following examples to measure adhesion and release values. The compositions were casted to about a 2-mil thickness onto one-inch-wide strips of "SCOTCH-PAK" 1022 Release Liner, a polyester film coated with a release coating, the release liner being available from the 3M Company, St. Paul, Minn. After coating, a one-inch-wide strip of MYLAR polyester film was adhered to each casted sample with a 4.5 lb. roller.

Measurement of Release Value

Release values were obtained by stripping the tape from the "SCOTCH-PAK" 1022 Release Liner at a rate of 40 inches/minutes at an angle of 180° while attached to a tensile testing machine, with the results being expressed in grams per centimeter. An average value over the entire length of the liner was recorded. It is preferred that the release values be from about 0.5 to about 50 g/cm.

Measurement of Adhesion Value

The tapes (the pressure sensitive adhesive composition on MYLAR) were each adhered to a stainless steel panel with a 4.5 lb. roller and allowed to rest for 15 minutes. The adhesion measurements were obtained by stripping each tape from the panel at a rate of 12 inches/minute at an angle of 180° while attached to a tensile testing machine, with the results expressed in grams per centimeter. It is preferred that the adhesion values be from about 100 to about 2000 g/cm.

Measurement of Tack Value

Tack generally correlates with the adhesives ability to stick, but is a difficult property to quantify. Tack was measured on the compositions in the following examples using a "POLYKEN" Probe Tack Tester, Series 400, made by Testing Machines, Inc., Amityville, N.Y. The speed of the probe was controlled at 1.0 cm/second, and the dwell time of the probe was 0.5 seconds. It is preferred that the tack values be from about 50 to about 800 g.

Measurement of Cold Flow

Cold flow was measured by (a) rolling, into a ball, a piece of the pressure sensitive adhesive composition which weighs, in grams, twice its specific gravity, (b) pressure adhering the ball to a papered surface inclined to 30°, and (c) measuring the distance the ball moves after 7 days of being placed on the inclined papered surface at room temperature. The paper used on the included surface was manilla folder paper #2-153LK-3 from Smead, Inc., Hastings, Minn. An additive to a pressure sensitive adhesive is considered to significantly improve cold flow if the cold flow with the additive is less than about 95% of the cold flow of the pressure sensitive adhesive without the additive.

EXAMPLES 1A–3B

In Examples 1A and 1B, 5.5 parts by weight of a silicone urea copolymer were blended with 94.5 parts by weight of PSA "A". In Example 1A, SILICONE UREA "A" was used, and, in Example 1B, SILICONE UREA "C" was used.

In Examples 2A–2C, 5.5 parts by weight of a silicone urea copolymer were blended with 94.5 parts by weight of PSA "C". In Example 2A, SILICONE UREA "A" was used, in Example 2B, SILICONE UREA "B" was used, and, in Example 2C, SILICONE UREA "C" was used.

In Examples 3A and 3B, 5.5 parts by weight of a silicone urea copolymer were blended with 94.5 parts by weight of PSA "D". In Example 3A, SILICONE UREA "B" was used, and, in Example 3B, SILICONE UREA "C" was used.

Cold flow, release, adhesion, and tack values were determined on the blends, and the values are listed in Table I along with the thickness of the tape used during the measurements. Values for PSA "A" without an additive are provided as Example C-1 (comparative example). Values for PSA "C" without an additive are provided as Example C-2. Values for PSA "D" without an additive are provided as Example C-3.

TABLE I

| Example # | Cold Flow (cm) | Thickness (mils) | Release (g/cm) | Adhesion (g/cm) | Tack (g) |
|---|---|---|---|---|---|
| 1A | 1.8 | 2.4 | 165.0 | 520.0 | 558 |
| 1B | 2.0 | 2.1 | 48.0 | 319.0 | 601 |
| C-1 | 2.2 | 2.2 | 6.0 | 597.0 | 237 |
| 2A | 1.0 | 2.3 | 33.0 | 562.0 | 363 |
| 2B | 2.7 | 2.2 | 396.0 | 370.0 | 820 |
| 2C | 1.4 | 2.2 | 12.0 | 627.0 | 641 |
| C-2 | 4.5 | 2.3 | 18.0 | 613.0 | 727 |
| 3A | 1.4 | 2.1 | 7.0 | 173.0 | 72 |
| 3B | 1.5 | 2.2 | 155.0 | 491.0 | 864 |
| C-3 | 1.9 | 2.0 | 21.0 | 549.0 | 542 |

EXAMPLES 4A–4H

In Examples 4A–4H, SILICONE UREA "A" was blended with PSA "B" and a linear trimethyl-endblocked polydimethylsiloxane (PDMS) fluid having a viscosity of 100 cSt. at 25° C. Table II provides the compositions in parts by weight of the blends for Examples 4A–4H.

TABLE II

| Example # | SILICONE UREA "A" | PSA "B" | PDMS |
|---|---|---|---|
| 4A | 5 | 94 | 1 |
| 4B | 5 | 90 | 5 |
| 4C | 5 | 85 | 10 |
| 4D | 5 | 80 | 15 |
| 4E | 5 | 75 | 20 |
| 4F | 10 | 70 | 20 |
| 4G | 15 | 65 | 20 |
| 4H | 20 | 60 | 20 |

Cold flow, release, adhesion, and tack values were determined on the blends, and the values are listed in Table III along with the thickness of the tape used during the measurements.

TABLE III

| Example # | Cold Flow (cm) | Thickness (mils) | Release (g/cm) | Adhesion (g/cm) | Tack (g) |
|---|---|---|---|---|---|
| 1A | 0 | 2.4 | 2.0 | 536.0 | 124 |
| 4B | 0 | 2.4 | 6.0 | 426.0 | 149 |
| 4C | 0 | 2.4 | 11.0 | 311.0 | 215 |
| 4D | 0 | 2.2 | 11.0 | 198.0 | 349 |
| 4E | 0 | 2.3 | 15.0 | 112.0 | 486 |
| 4F | 0 | ND* | ND | ND | ND |
| 4G | 0 | ND | ND | ND | ND |
| 4H | 0 | ND | ND | ND | ND |

*Not determined

EXAMPLES 5A–5K

In Examples 5A–5K, SILICONE UREA "A" was blended with PSA "C" and a linear trimethyl-endblocked polydimethylsiloxane (PDMS) fluid having a viscosity of 100 cSt. at 25° C. Table IV provides the compositions in parts by weight of the blends for Examples 5A–5K.

TABLE IV

| Example # | SILICONE UREA "A" | PSA "C" | PDMS |
|---|---|---|---|
| 5A | 5 | 94 | 1 |
| 5B | 5 | 90 | 5 |
| 5C | 5 | 85 | 10 |
| 5D | 10 | 80 | 10 |
| 5E | 15 | 75 | 10 |
| 5F | 20 | 70 | 10 |
| 5G | 5 | 80 | 15 |
| 5H | 5 | 75 | 20 |
| 5I | 10 | 70 | 20 |
| 5J | 15 | 65 | 20 |
| 5K | 20 | 60 | 20 |

Cold flow, release, adhesion, and tack values were determined on the blends, and the values are listed in Table V along with the thickness of the tape used during the measurements.

TABLE V

| Example # | Cold Flow (cm) | Thickness (mils) | Release (g/cm) | Adhesion (g/cm) | Tack (g) |
|---|---|---|---|---|---|
| 5A | 2.7 | 2.2 | 36.0 | 688.0 | 895 |
| 5B | 4.1 | 2.2 | 52.0 | 668.0 | 824 |
| 5C | 5.8 | 2.2 | 121.0 | 428.0 | 584 |
| 5D | 3.5 | 2.4 | 216.0 | 256.0 | 472 |
| 5E | 3.9 | 2.3 | 302.0 | 160.0 | 169 |
| 5F | 3.8 | 2.1 | 381.0 | 137.0 | 446 |
| 5G | 9.3 | 2.2 | 214.0 | 206.0 | 408 |
| 5H | 14.4 | 2.2 | 161.0 | 67.0 | 186 |
| 5I | 6.8 | 2.2 | 57.0 | 56.0 | 212 |
| 5J | 5.6 | 2.2 | 73.0 | 70.0 | 85 |
| 5K | 5.8 | 2.2 | 168.0 | 71.0 | 96 |

These and other variations of the present invention may be made which fall within the scope of the appended claims even though such variations were not specifically discussed above.

What is claimed is:

1. A pressure sensitive adhesive composition, comprising a mixture of:

(A) a silicate resin pre-reacted with (B) a silicone fluid; and (C) a thermoplastic multi-segmented copolymer which is a product of the reaction between a diisocyanate and a reactive polyorganosiloxane having two groups reactive with isocyanate, wherein the pressure sensitive adhesive composition exhibits tackiness and exhibits adhesiveness upon applying pressure thereto, wherein the composition comprises from about 75 to about 99 weight percent of the pre-reaction product of (A) and (B) and from about 1 to about 25 weight of the thermoplastic multi-segmented copolymer based on the total weight of components (A), (B) and C.

2. A pressure sensitive adhesive composition, comprising a mixture of:

from about 75 to 99 weight percent of (A) a silicate resin and (B) a silicone fluid; wherein said silicate resin and silicone fluid are pre-reacted together and employed in a weight ratio from about 40:60 to about 70:30 silicate resin to silicone fluid; and from about 1 to about 25 weight percent of (C) a thermoplastic multi-segmented copolymer which is added after said reaction between said silicate resin and silicone fluid and is a product of the reaction between 0.95 to 1.05 moles of a diisocyanate and 1.0 mole of a reactive polyorganosiloxane having two groups reactive with isocyanate, wherein the composition comprises from about 75 to about 99 weight percent of the pre-reaction product of (A) and (B) and from about 1 to about 25 weight of the thermoplastic multi-segmented copolymer, based on the total weight of components (A), (B) and C, wherein the pressure sensitive adhesive composition exhibits tackiness and exhibits adhesiveness upon applying pressure thereto, and wherein the thermoplastic multi-segmented copolymer comprises from about 1 to about 40 weight percent hard segments derived from reactants selected from the group consisting of organic diisocyanates, organic diols, and organic diamines and from about 60 to 99 weight percent soft segments consisting essentially of polyorganosiloxane units and the polyorganosiloxane units are in segments of from about 10 to about 200 organosiloxy units, and wherein said pressure sensitive adhesive further contains a bioactive agent.

3. The composition as set forth in claim 1, wherein the silicate resin is a benzene-soluble resinous copolymer containing silicon-bonded hydroxyl radicals and consisting essentially of triorganosiloxy units of the formula $R_3SiO_{1/2}$ and tetrafunctionalsiloxy units of the formula $SiO_{4/2}$ in a ratio of about 0.6 to 0.9 triorganosiloxy units for each tetrafunctionalsiloxy unit present in the copolymer, wherein each R is a monovalent organic radical independently selected from the group consisting of hydrocarbon radicals of from 1 to 6 inclusive carbon atoms.

4. The composition as set forth in claim 2, wherein the silicate resin is a cohydrolysis product of a trialkyl hydrolyzable silane and an alkyl silicate, wherein the cohydrolysis product contains a plurality of silicon-bonded hydroxy groups.

5. The composition as set forth in claim 2, wherein the silicate resin and the silicone fluid together constitute from about 90 to about 99 weight percent of the pressure sensitive adhesive composition and the thermoplastic multi-segmented copolymer constitutes from about 1 to about 10 weight percent of the pressure sensitive adhesive composition.

6. The composition as set forth in claim 2, Wherein the thermoplastic multi-segmented copolymer comprises from about 1 to about 40 weight percent hard segments derived from reactants selected from the group consisting of organic diisocyanates, organic diols, and organic diamines and from about 60 to about 99 weight percent soft segments comprising from about 15 to about 99 weight percent, based on the weight of the thermoplastic multi-segmented copolymer, of polyorganosiloxane units and from about 0 to 70 weight percent, based on the weight of the thermoplastic multi-segmented copolymer, of polyalkylene oxide units.

7. The composition as set forth in claim 2, wherein the degree of polymerization of the reactive polyorganosiloxane is from about 10 to about 300.

8. The composition as set forth in claim 2, wherein the reactive polyorganosiloxane is selected from the group consisting of amino-functional polyorganosiloxanes, carbinol-functional polyorganosiloxanes, mercapto-functional polyorganosiloxanes, and epoxy-functional polyorganosiloxanes.

9. The composition as set forth in claim 2, wherein the thermoplastic multi-segmented copolymer has a number average molecular weight of from about 30,000 to about 120,000.

13

10. The pressure sensitive adhesive composition as set forth in claim 1, wherein the pressure sensitive adhesive composition exhibits a cold flow of less than about 95% of the cold flow of the pressure sensitive adhesive composition prepared without the thermoplastic multi-segmented copolymer, the cold flow being measured by (a) rolling, into a ball, a piece of the pressure sensitive adhesive composition which weighs, in grams, twice its specific gravity, (b) pressure adhering the ball to a papered surface inclined to 30°, and (c) measuring the distance the ball moves after 7 days of being placed on the inclined papered surface.

11. The composition as set forth in claim 2, having an adhesion value of from about 100 to about 2000 g/cm measured by (a) preparing a tape by casting a pressure sensitive adhesive composition 2-mils thick onto a one-inch-wide strip of release liner and adhering thereto, using a 4 pound roller, a one inch wide strip of polyester film, (b) stripping the release liner from the tape, (c) adhering the side of the tape having the pressure sensitive adhesive composition thereon to a stainless steel panel using a 4.5-pound roller, (d) allowing the tape to rest adhered to the stainless steel panel for 15 -minutes, and (e) measuring the force required to strip the tape from the stainless steel panel at a rate of 12 inches/minute at an angle of 180° using a tensile testing machine.

12. The composition as set forth in claim 2, having a tack value of from about 50 to about 800 grams measured using a probe tack tester controlled at a speed of 1 cm/second and a dwell time of 0.5 second.

13. The composition as set forth in claim 2, wherein the composition has a release value of from about 0.5 to about 50 g/cm measured by (a) preparing a tape by casting a pressure sensitive adhesive composition 2-mils thick onto a one-inch-wide strip of release liner and adhering a one-inch-wide strip of polyester film to the casted composition using a 4.5-pound roller and (b) measuring the force required to strip the release liner from the tape at a rate of 40 inches/minute at an angle of 180° using a tensile testing machine.

14. A pressure sensitive adhesive composition, comprising a mixture of:

from about 75 to 99 weight percent of (A) a silicate resin and (B) a silicone fluid; wherein said silicate resin and silicone fluid are pre-reacted together and employed in a weight ratio from about 40:60 to about 70:30 silicate resin to silicone fluid; and from about 1 to about 25 weight percent of (C) a thermoplastic multi-segmented copolymer which is added after said reaction between said silicate resin and silicone fluid and is a product of the reaction between 0.95 to 1.05 moles of a diisocyanate and 1.0 mole of a reactive polyorganosiloxane having two groups reactive with isocyanate, wherein the composition comprises from about 75 to about 99 weight percent of the pre-reaction product of (A) and (B) anf from about 1 to about 25 weight of the thermoplastic multi-segmented copolymer, based on the total weight of components (A), (B) and C, wherein the pressure sensitive adhesive composition exhibits tackiness and exhibits adhesiveness upon applying pressure thereto, and wherein the thermoplastic multi-segmented copolymer comprises from about 1 to about 40 weight percent hard segments derived from reactants selected from the group consisting of organic diisocyanates, organic diols, and organic diamines and from about 60 to 99 weight percent soft segments consisting essentially of polyorganosiloxane units and the polyorganosiloxane

14 units are in segments of from about 10 to about 200 organosiloxy units, and wherein the pressure sensitive adhesive composition exhibits a cold flow of less than about 95% of the cold flow of the pressure sensitive adhesive composition prepared without the thermoplastic multi-segmented copolymer, the cold flow being measured by (a) rolling, into a ball, a piece of the pressure sensitive adhesive composition which weighs, in grams, twice its specific gravity, (b) pressure adhering the ball to a papered surface inclined to 30°, and (c) measuring the distance the ball moves after 7 days of being placed on the inclined papered surface, and wherein said pressure sensitive adhesive composition further contains a bioactive agent.

15. The composition as set forth in claim 14, wherein the silicate resin is a benzene-soluble resinous copolymer containing silicon-bonded hydroxyl radicals and consisting essentially of triorganosiloxy units of the formula $R_3SiO_{1/2}$ and tetrafunctionalsiloxy units of the formula $SiO_{4/2}$ in a ratio of about 0.6 to 0.9 triorganosiloxy units for each tetrafunctionalsiloxy unit present in the copolymer, wherein each R is a monovalent organic radical independently selected from the group consisting of hydrocarbon radicals of from 1 to 6 inclusive carbon atoms.

16. The composition as set forth in claim 14, wherein the silicate resin is a cohydrolysis product of a trialkyl hydrolyzable silane and an alkyl silicate, wherein the cohydrolysis product contains a plurality of silicon-bonded hydroxy groups.

17. The composition as set forth in claim 14, wherein the reactive polyorganosiloxane is selected from the group consisting of amino-functional polyorganosiloxanes, carbinol-functional polyorganosiloxanes, mercapto-functional polyorganosiloxanes, and epoxy-functional polyorganosiloxanes.

18. The composition as set forth in claim 14, wherein the thermoplastic multi-segmented copolymer has a number average molecular weight of from about 30,000 to about 120,000.

19. The composition as set forth in claim 14, having an adhesion value of from about 100 to 2000 g/cm measured by (a) preparing a tape by casting a pressure sensitive adhesive composition 2-mils thick onto a one-inch-wide strip of release liner and adhering thereto a one-inch-wide strip of polyester film, using a roller (b) stripping the release liner from the tape, (c) adhering the side of the tape having the pressure sensitive adhesive composition thereon to a stainless steel panel using a 4.5-pound roller, (d) allowing the tape to rest adhered to the stainless steel panel for 15 minutes, and (e) measuring the force required to strip the tape from the stainless steel panel at a rate of 12 inches/minute at an angle of 180° using a tensile testing machine.

20. The composition as set forth in claim 14, having a tack value of from about 50 to about 800 grams measured using a probe tack tester controlled at a speed of 1 cm/second and a dwell time of 0.5 second.

21. The composition as set forth in claim 14, wherein the composition has a release value of from about 0.5 to about 50 g/cm measured by (a) preparing a tape by casting a pressure sensitive adhesive composition 2-mils thick onto a one-inch-wide strip of release liner and adhering a one-inch-wide strip of polyester film to the casted composition using a 4.5-pound roller and (b) measuring the force required to strip the release liner from the tape at a rate of 40 inches/minute at an angle of 180° using a tensile testing machine.

* * * * *